United States Patent [19]

Toyoguchi

[11] Patent Number: 5,022,023
[45] Date of Patent: Jun. 4, 1991

[54] DISC DRIVE ARRANGEMENT FOR CD PLAYER AND THE LIKE CAPABLE OF LOADING DIFFERENT SIZE DISCS

[75] Inventor: Tsutomu Toyoguchi, Tokyo, Japan

[73] Assignee: Sony Corporation, Tokyo, Japan

[21] Appl. No.: 208,885

[22] Filed: Jun. 20, 1988

[30] Foreign Application Priority Data

Jun. 23, 1987 [JP] Japan .............................. 62-96259[U]
Jun. 30, 1987 [JP] Japan ................................ 62-163285

[51] Int. Cl.⁵ ........................ G11B 33/02; G11B 27/00
[52] U.S. Cl. ...................................... 369/77.1; 369/75.2
[58] Field of Search ..................... 369/77.1, 77.2, 75.1, 369/79

[56] References Cited

U.S. PATENT DOCUMENTS

| | | | |
|---|---|---|---|
| 4,498,162 | 2/1985 | Schatteman | 369/77.1 |
| 4,580,256 | 4/1986 | Inaba et al. | 369/77.1 |
| 4,592,039 | 5/1986 | Toyoguchi et al. | 369/75.2 |
| 4,625,304 | 11/1986 | Kanamaru et al. | 369/75.2 |
| 4,641,298 | 2/1987 | Ikedo et al. | 369/77.1 |

FOREIGN PATENT DOCUMENTS 57-130260 8/1982 Japan .................................. 369/77.1
60-214469 10/1985 Japan .................................. 369/77.1

Primary Examiner—Stuart S. Levy
Assistant Examiner—Kenneth B. Wells
Attorney, Agent, or Firm—Philip M. Shaw, Jr.

[57] ABSTRACT

When a large diameter disc is inserted into the disc drive, diameter sensing probes detect the large diameter and unlock movable disc guides and subsequently induce the guides to separate to levels wherein passage of the large diameter disc is facilitated. The guides are locked in a manner which prevents the same from returning to the positions suited for guiding small diameter discs until such time as the large diameter disc is unloaded from the device.

Levers mounted in the drive respond to the diameter of the disc loaded and assume configurations relative to the diameter of the loaded disc. The levers are locked in a configuration suited for small discs until such time as a large disc is introduced. At this time the levers are unlocked. A locking mechanism senses the peripheral edge of the disc and hold the arrangement in a configuration suited for the larger diameter.

9 Claims, 13 Drawing Sheets

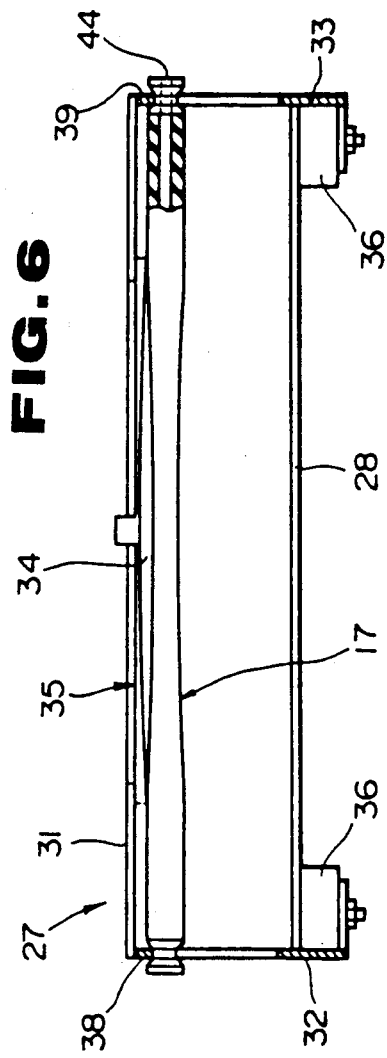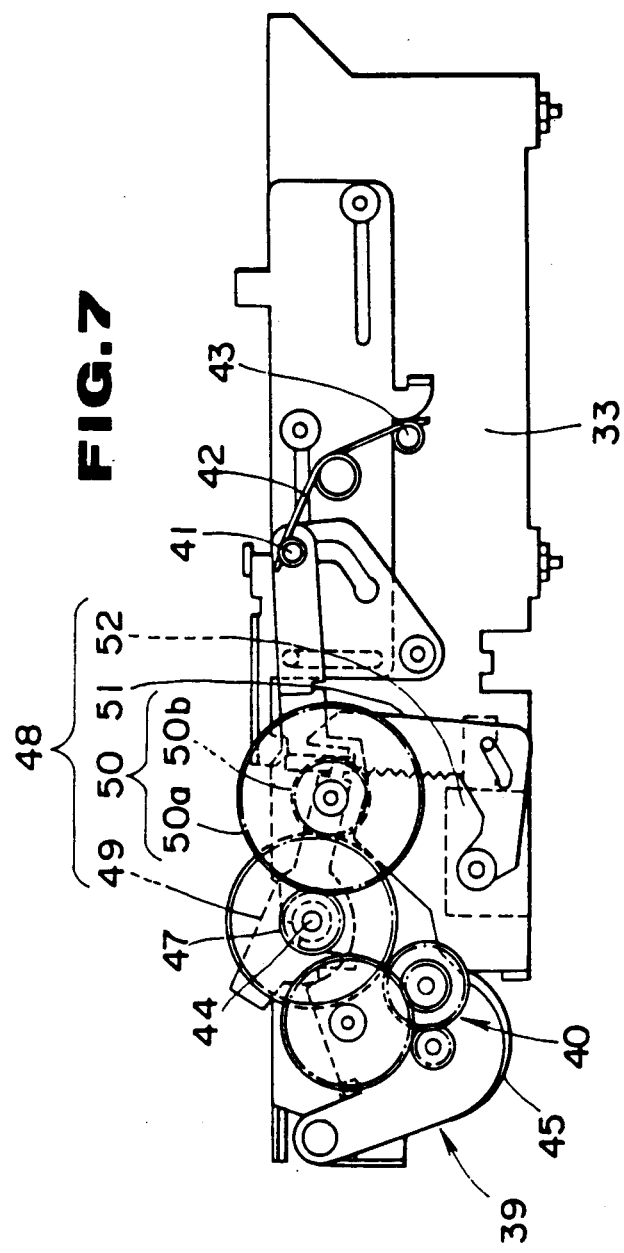

DISC DRIVE ARRANGEMENT FOR CD PLAYER AND THE LIKE CAPABLE OF LOADING DIFFERENT SIZE DISCS

BACKGROUND OF THE INVENTION

1. Field of the Invention

The present invention relates generally to a disc drive arrangement and more specifically to a so called "slot in" loading type disc drive arrangement which can correctly load discs of different sizes.

2. Description of the Prior Art

Of recent times CD players using the so called "slot in" loading type arrangements have been widely used in connection with automotive vehicle type stereo systems. FIGS. 15 and 16 show a previously proposed disc in loading type arrangement. In these figures a disc loading passage or slot 1 is provided with a disc loading roller 2 which cooperates with a disc 3 for the purposes of moving the disc into an operative position.

When the disc is being loaded the loading roller 2 engages the disc 3 and is rotated in a first predetermined rotational direction. When the disc 3 is unloaded the loading roller 2 is rotated in the opposite rotational direction.

In addition to the loading roller 2, the arrangement includes a guide plate 4 which is located in a manner to engage the surface of the disc 3 opposite to that which the loading roller contacts. As will be appreciated from the drawings, the loading roller 2 is arranged to have a small diameter center portion and outwardly tapering larger diameter end sections. At the same time, the guide plate 4 is arranged so that the surface thereof in contact with the disc is concavely curved. With this arrangement surfaces of the disc 3 are engaged by the loading roller 2 and the guide plate 4 and therefore protected from damage such as scratching, abrasion and the like.

However, with this type of prior art arrangement a problem is encountered that it is difficult to load discs of different size, for example 12cm and 8cm. Viz., in order to permit the larger diameter 12cm discs to be loaded it is necessary to arrange the loading slot width to be sufficiently wide to permit the entry of the larger of the two discs. This requirement also tends to fix many of the other dimensions of the device in a manner whereby when a smaller 8cm diameter disc 5 is loaded, such as shown in FIG. 17, the disc is subject to very little centering and is able to move off center from the position illustrated in solid line to that illustrated in phantom.

To overcome this problem it has been proposed to provide a small disc guide arrangement in the guide slot immediately before the loading roller 2. However, as this guide is fixedly disposed in the loading slot its provision prevents the loading of the larger 12cm discs.

A further problem is encountered in that the disc guide plate 4 which is located adjacent to the tapered loading roller 2 is arranged to be concave for the purpose of ensuring that contact between the roller and the guide plate only occurs at the periphery of the disc which is not used for recording purposes. In the event that sufficient clearance is set to permit the entry of a large diameter disc, when a small diameter disc is inserted, an overly large clearance occurs in the region that the disc should be gripped. The result is that slippage occurs which often leads to delayed or improper loading. Conversely, if the clearance is set for small diameter discs, when a large diameter one is inserted excessive contact between the guide plate and the surface of the disc on which material is recorded tends to occur and tends to lead to scratching and other like damage.

SUMMARY OF THE INVENTION

It is an object of the present invention to provide an arrangement which permits both large and small diameter discs to be readily loaded onto the turntable of a disc drive without damage or improper centering.

In brief, the above object is achieved by an arrangement wherein when a large diameter disc is inserted into the disc drive, diameter sensing probes detect the large diameter and unlock movable disc guides and subsequently induce the guides to separate to levels wherein passage of the large diameter disc is facilitated. The guides are locked in a manner which prevents them from returning to the positions suited for guiding small diameter discs until such time as the large diameter disc is unloaded from the device.

Lever means mounted in the drive respond to the diameter of the disc loaded and assume configurations relative to the diameter of the loaded disc. The lever means is locked in a configuration suited for small discs until such time as a large disc is introduced. At this time the lever means is unlocked. The means includes means which sense the peripheral edge of the disc and hold the arrangement in a configuration suited for the larger diameter.

More specifically a first embodiment of the present invention takes the form of a disc drive for discs of first and second diameters which features: a guide slot through which the disc is introduced into said drive; first and second movable disc guides; and a slide arrangement operatively connected with said first and second disc guides. A lock arrangement is provided for selectively locking said first and second movable guides in first and second predetermined positions. The first position is suited to guiding discs having a first diameter and the second position is suited to guiding discs having a second diameter said second diameter being larger that the first diameter. A arrangement is responsive to the diameter of the disc being inserted. The sensor arrangement is operatively connected with said lock arrangement for releasing the same from a position suited for discs having a first diameter and permitting said disc guides to be moved to a new second position suited for discs having a second diameter.

A second aspect of the present invention comes in that the above mentioned disc drive further features: a loading roller which is disposed in said guide slot. The roller has a central portion and two tapered axial end portions. The central portion has a diameter which is less than that of the axial ends of the roller, said two tapered axial end portions tapering outwardly from said central portion to said ends. A guide plate is disposed in said guide slot in a manner to juxtapose said loading roller. The guide plate has a concave surface, and is arranged with respect to said loading roller in a manner wherein the disc which is being loaded into the drive is contacted on a first surface by said guide plate and contacted on a second opposite surface by said loading roller. The arrangement of said guide plate and said loading roller is that said disc is contacted only at the peripheral edge portions thereof.

A third aspect of the invention comes in that the guide plate mentioned above is resiliently mounted in said guide slot in a manner to be biased toward said loading roller and is formed with recesses into which the tapered axial end portions of said loading roller can be received. The recesses are so shaped and sized with respect to the size and shape of said loading roller that when the axial end portions of said loading roller are received in said recesses, said guide plate and said loading roller are spaced by a distance suitable for loading discs having said first diameter.

A fourth aspect of the invention comes in that said slide arrangement comprises: first and second essentially flat slide plates which are arranged one on the other and each formed with first and second guide slots. First and second slide guide pins are fixed to the surface of an upper frame member and received in said first guide slots of said first and second slide plates. A third slide guide pin is fixed to said upper frame guide and received in said second guide slots of said first and second guide plates.

A fifth aspect of the invention comes in that said first and second movable disc guides are supported on said first and second slide plates respectively. The first guide slots of said first and second slide plates are being arranged so that when said first and second slide guide pins proximate the inboard ends of said first slots, said first and second slide plates have been moved in a manner to achieve the maximum separation of said first and second movable disc guides. When said first and second slide guide pins engage the outboard ends of said first slots, said first and second slide plates have been moved in a manner to achieve the minimum separation of said movable disc guides. This minimum separation is essentially equal to said first diameter and maximum separation is essentially equal to said second diameter.

A further aspect of the present invention comes in that the lock arrangement comprises: first and second lock plates which are pivotally mounted on the outboard ends of said first and second slide plates respectively. The first and second lock plates are formed with recesses which respectively engage said first and second lock pins when said first and second slide plates assume positions wherein said first and second movable disc guides are separated by said minimum separation and said first and second lock plates, are rotated to first locking positions. The first and second lock plates are formed with stopper portions which engage said first and second slide guide pins when said first and second slide plates assume positions wherein said first and second movable disc guides are separated by said maximum separation and wherein said first and second lock plates are rotated to second lock positions.

Another aspect of the present invention is deemed to come in that the sensor arrangement comprises first and second probes which are mounted on said first and second lock plates. The first and second probes assume positions wherein no contact occurs between said probes and the peripheral edges of a disc having said first diameter. The first and second probes are moved away from each other when a disc having a second diameter is inserted into said guide slot. The movement of said first and second probes under such conditions causes said first and second lock plates to rotate away from their respective first locking positions and toward their respective second locking positions.

An eighth aspect of the instant invention is deemed to come in the further provision of lever means, which includes a first angled lever pivotally mounted on said upper frame are supporting a switch and actuating lever arrangement which is responsive to the entry of a disc into the drive and which produces a signal indicative of the loading of the disc into said drive entry. Contact means is mounted on said first angled lever to be engageable with the peripheral edge of the disc which is loaded into said drive. A second angled lever is operatively connected at one end to one end of said first angled lever The second angled lever includes an edge sensing pin engageable with the peripheral edge of the disc which is loaded into said drive. The first and second angled levers are biased in a manner which causes said contact means and said edge sensing pin to move inwardly and essentially toward a turntable in said drive and on which the disc which is loaded into said drive is deposited.

Another aspect of the invention is deemed to be that the first angled lever includes a flange member. A first pivotal plate member is pivotally mounted on said first slide plate and biased in a direction to rotate inwardly. The first pivotal plate has a lock member which is engageable with said flange member in manner to lock said lever means in a predetermined arrangement. The first pivotal plate has a lock member in manner to lock the insertion of a disc having a second diameter into said guide slot, in a manner to release the engagement between said lock member and said flange.

BRIEF DESCRIPTION OF THE DRAWINGS

The features and attendant advantages of the present invention will become more clearly understood from the following description of the preferred embodiments taken in conjunction with the appended drawings in which:

FIG. 6 is a front elevation of the embodiment depicted in FIG. 1 showing the relationship between the loading roller and a guide plate which cooperates therewith;

FIGS. 7 and 8 are side elevations of the embodiment depicted in FIG. 1 showing the drive connection arrangement which interconnects a loading roller drive motor and a rack arrangement which raises and lowers various elements of the device vital for placing the loaded disc on the turntable of the device;

DESCRIPTION OF THE PREFERRED EMBODIMENTS

1. Outline Of Disc Loading Device

Figure 1:
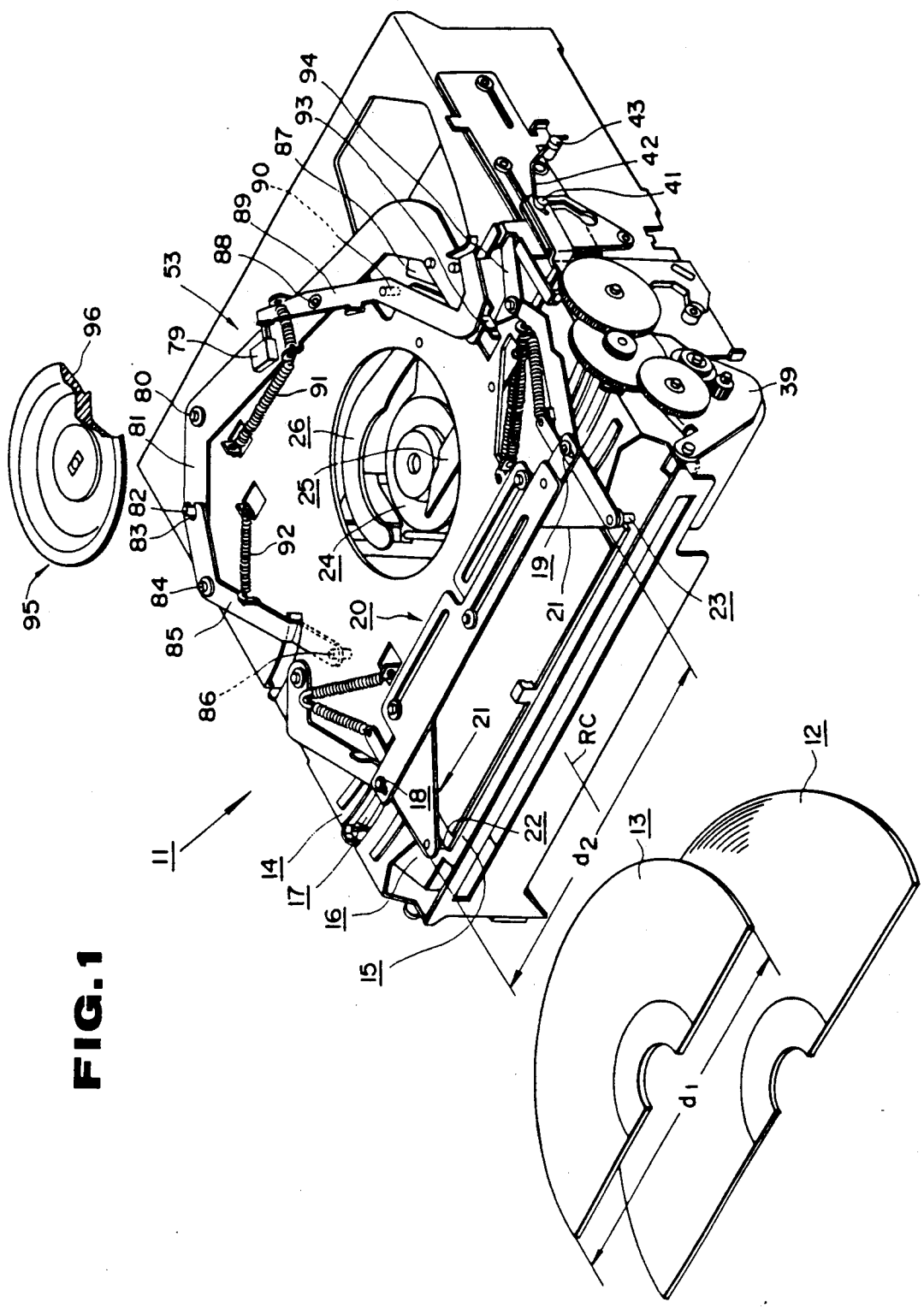
FIG. 1 is a perspective view partially exploded view of an embodiment of the present invention with some portions broken away and in section.
Figure 2:
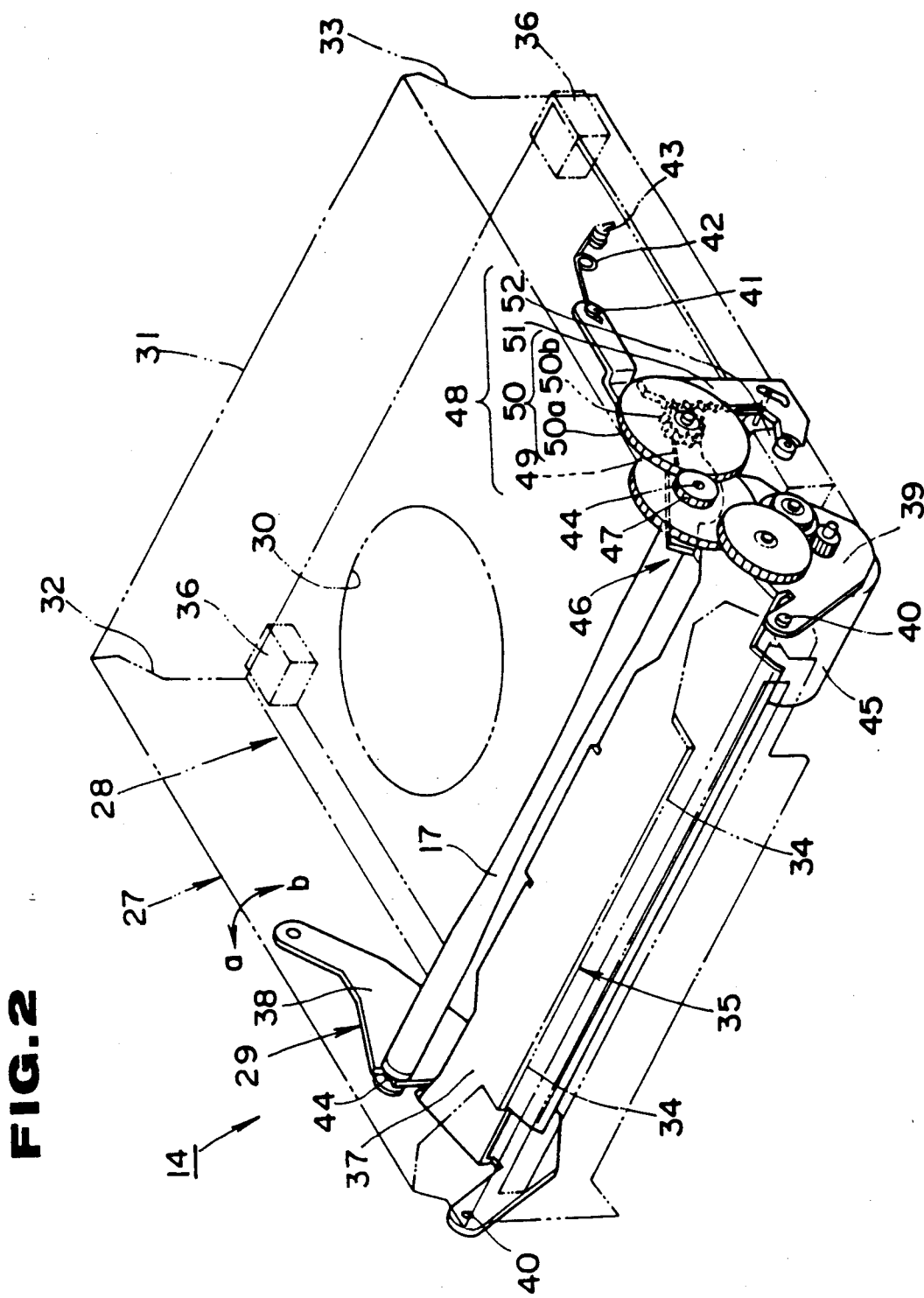
FIG. 2 is a perspective view showing a frame arrangement which forms a vital part of the instant embodiment.

Referring now to FIGS. 1 and 2, a CD player 11 suited for automotive application is shown. This device is arranged to receive and center large diameter (12 cm) type discs 12 (hereinafter referred to as large discs) and small diameter (8 cm) discs 13 (hereinafter referred to as small discs). The chassis of the device includes a frame or section 14. This frame 14 includes a structure which define a loading mouth or entrance 15. When large and small discs are inserted through entrance 15 into the interior of a loading slot 16, they come into contact with a loading roller 17 which is disposed therein. The arrangement further includes what shall be referred to as small disc guides 18 and 19 which are located in front of the loading roller 17; a slidable guide position changing device 20 which is operatively connected with the small disc guides 18, 19; lock devices 21 which fix the small disc guides 18, 19 and the position changing device 20 in preselected positions depending on the size of the disc being loaded; disc diameter sensing probes 22, 23 which are disposed on the lock devices 21; a turntable 24; and clamp release arms 25, 26.

2. Basic Outline Of Frame Constructions

FIGS. 2 to 5 show details of the frames which form a part of the embodiment of the present invention. As will be appreciated from these figures, the above mentioned small disc guides 18, 19; guide position changing device 20; lock devices 21; an upper frame member 27 (to which the preceeding elements are connected); the above mentioned disc loading roller 17 and turntable 24 are operatively connected with a pivotal frame arrangement generally denoted by the numeral 29, in FIG. 2.

The upper frame 27 is provided with a clamp assembly opening 30 which is formed in an upper plate member 31 thereof. The upper frame 27 further includes downwardly depending flange or side members 32, 33. The guide position changing device 20 and the lock devices 21 are on the upper surface of the upper plate member 31. A disc upper surface guide plate 35 is mounted on the lower surface of the upper plate member 31 at a location between the edges thereof and in essentially the center of the same. This guide plate 35 is formed, as best seen in FIG. 6, to have a concave surface which is located above the loading roller 17 and which defines the upper surface of the loading slot 16. The concave shape of the guide plate 35 cooperates with the tapered construction of the guide roller in manner which ensures that only a peripheral portion of the disc being loaded is actually subject to contact.

Figure 3:
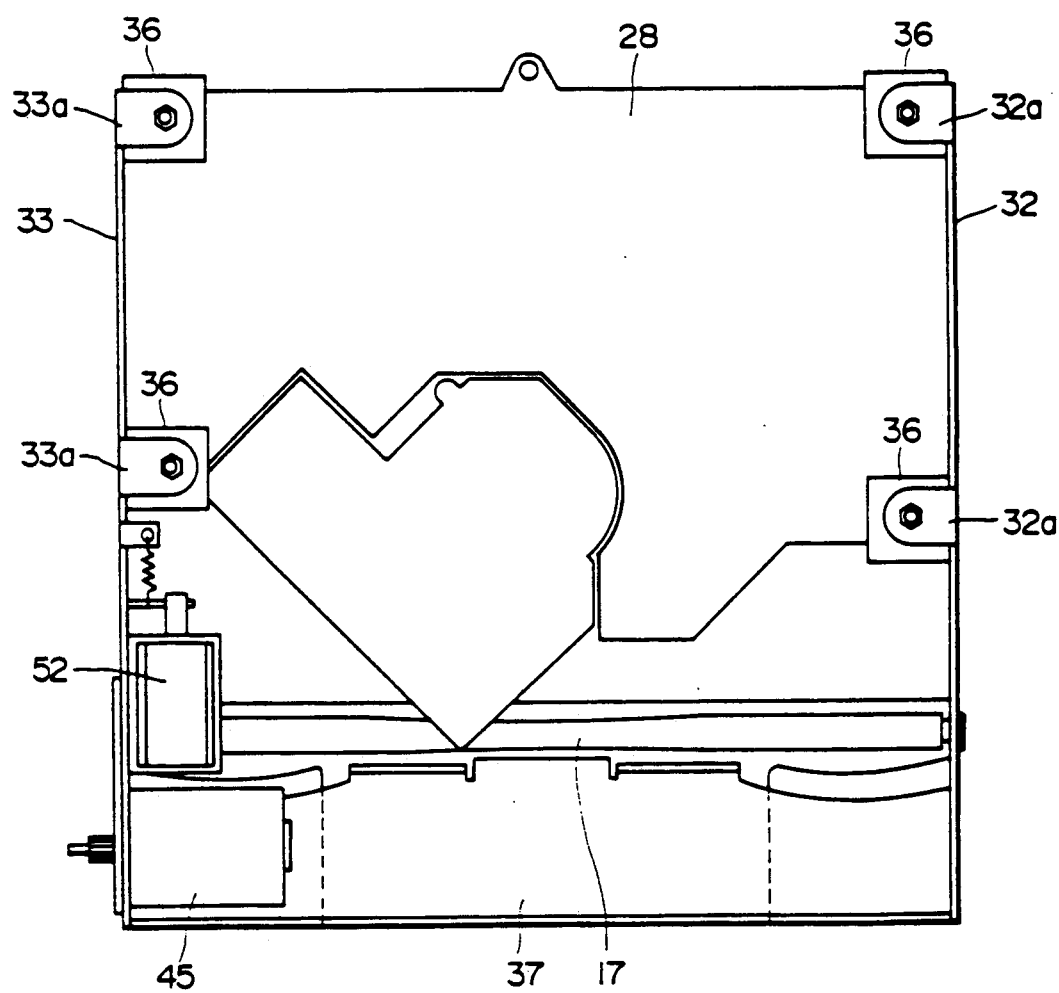
FIG. 3 is a plan view showing the underside of the arrangement shown in FIG. 1 which shows the details of the connection between the two major frame arrangements of the device.
Figure 4:
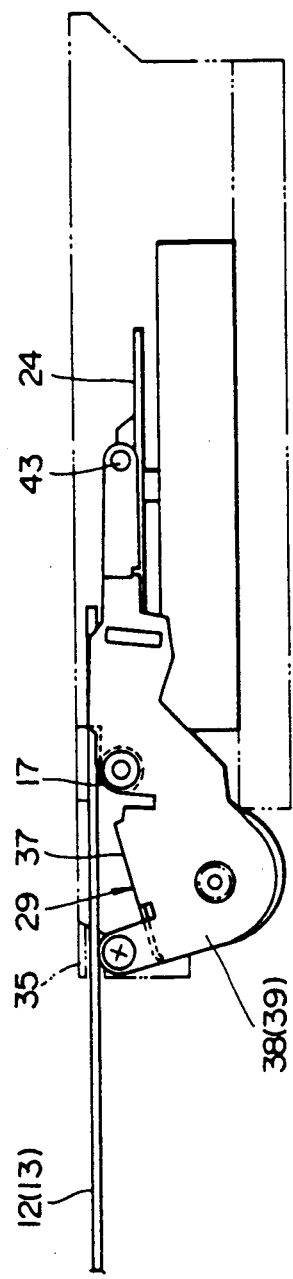
FIGS. 4 and 5 are side elevations of the embodiment depicted in FIG. 11 a pivotal frame member in so called "up" and "down" positions, respectively.
Figure 5:
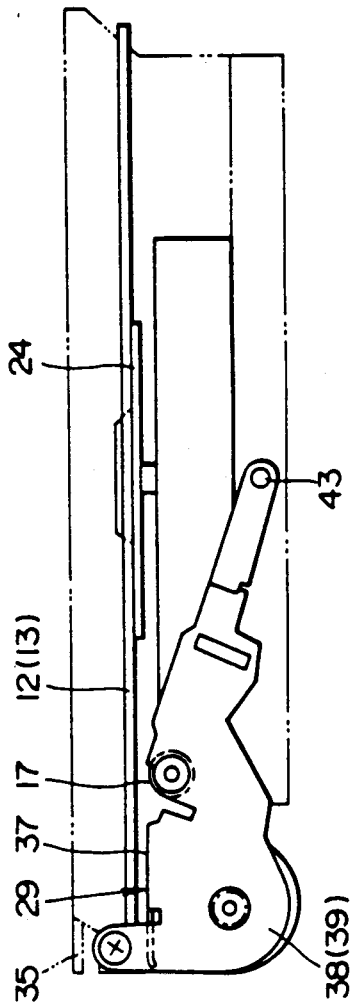

A lower frame member 28 is arranged, as shown in the bottom plan view of FIG. 3, to below the upper frame 27 and located so that the depending sides 32, 33 thereof are connected thereto through vibration damping bushes 36. In this instance the bushes are disposed beneath the lower plate 28 and sandwiched thereagainst by inwardly extending connection flanges 32a and 33a.

With this arrangement the upper frame 27 is suspended on the lower frame 28 in a manner wherein any vibration that may be transmitted to the lower frame member 28 from the vehicle chassis or the like to which it is connected, is prevented from reaching the upper frame 27, the turntable and light pickup which are supported thereon.

As best shown in FIG. 2, the pivotal frame comprises first and second pivotal arm members 38, 39 which are disposed on either side of the loading entrance. The ends of the loading roller 17 are rotatably carried by the pivot arm member 38, 39. The pivotal frame 29 further includes a disc suspension plate 37 which is integral with and which extends from pivotal arm 38 to pivotal arm 39. This plate is arranged at a level lower than the disc entrance opening 15. See FIGS. 4 and 5.

The arms 38 and 39 are pivotally connected with side members 32, 33 of the upper frame 27 via pins 40. The other ends of the arms 38 and 39 are formed with spring connection pins 41. The side members 32, 33 are formed with corresponding connection pins 43. Torsion springs 42 operatively interconnect the pins 41 and 43 in the manner shown in FIGS. 1 and 2. These springs 42 are arranged to provide a snap action which biases the arms 38, 39 in a manner which enables the upper frame 27 to be maintained selectively in either the position illustrated in FIG. 4 (viz., biased in the direction of arrow a) or that illustrated in FIG. 5 (direction of arrow b).

When the pivotal frame 29 is in its upper or "up" position (shown in FIG. 4), the disc upper surface guide plate 35 is located in a manner to cooperate with the disc loading roller 17 and appropriately contact a disc 12 (13) being loaded into the device. On the other hand, when the pivotal frame 29 assumes its lower or "down"-'position the loading roller 17 assumes the position illustrated in FIG. 5 which is considerably below this disc upper surface guide plate 35. At the same time the disc suspension plate 37 is rotated up to a horizontal position. As the pivotal frame 29 is rotated to the position shown in FIG. 5 the disc is lowered onto the disc turntable 24 by the movement of the leading roller 1.

3. Disc Loading Roller Construction

The loading roller 17 is arranged as best seen in FIG. 6 to be shaped in a manner that the axial center portion has the smallest diameter and so that the diameter of the element increases toward the axial ends thereof to define tapers. As previously disclosed, the pivotal arms 38 and 39 rotatably support on the ends of the loading roller 17. Accordingly, when the arms 38, 39 are pivotally fully in the counterclockwise direction about the pins 40, the disc guide plate 35 and the loading roller 17 are brought into suitable proximity of one and other.

Figure 8:
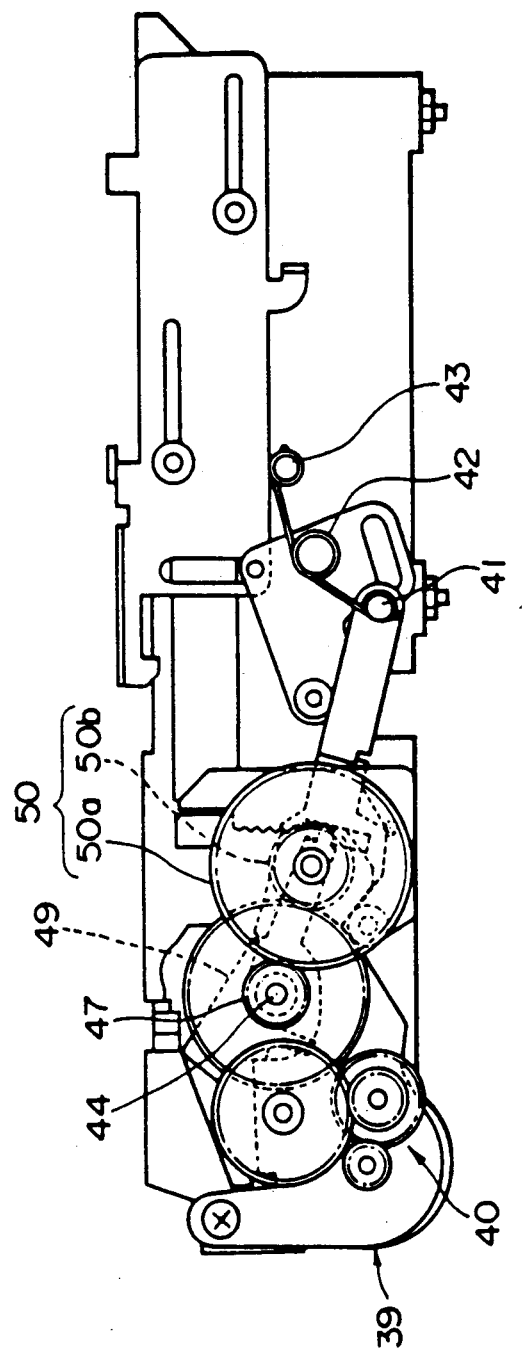

As shown in FIGS. 7 and 8, the pivotal frame 29 is arranged to pivoted about the axis of the pins 40 by a roller drive motor 45 (best shown in FIG. 3) which is operatively connected with the frame 29 through a step-down gear arrangement generally denoted by the numeral 46, and a pinion gear. The step-down gear arrangement 46 drives a pinion gear 47 which is rotatably supported on the pivotal arm 39 and mechanically attached to the shaft of loading roller 17. In this instance the motor is (as best seen in FIG. 3) located at the lower front right hand corner of the lower frame 28.

It should be noted that when the frame 29 is rotated in the clockwise direction as seen in FIGS. 7 and 8, a drive mechanism 48 is arranged to operate a pivotal arm 49. This arm 49 is arranged to carry an idler gear 50 having a large diameter section 50a and a small diameter section 50b. The larger diameter gear 50a is arranged to mesh with the pinion gear 47 while the smaller diameter gear 50b is arranged to engage with a rack 51. The rack 51 is operatively connected with an electromagnetic actuator 52 which is arranged to selectively move the rack into and out of engagement with the small diameter gear 50b.

With the above construction, when the roller drive motor 45 is energized, the disc loading roller 17 is induced to rotate and both large and small discs can be moved to a location directly above the turntable 24. In order to detect the completion of a disc loading operation a loading end sensor arrangement generally denoted by the numeral 53 is provided. See FIG. 1. When the disc is in position, the output of the sensor arrangement 53 is used to actuate the electromagnetic actuator 52 and bring the rack 51 into mesh with the small diameter gear portion 50b of the idler gear 50.

Following the engagement of the rack 51 and the idler gear 50, the idler gear runs along the rack 51 causing the pivotal frame 29 to rotate from the position shown in FIG. 7 to that shown in FIG. 8. This induces the disc which has been loaded to be lowered onto the turntable 24.

4. Small Disc Guide Mechanism

When a small disc having a diameter dl (see FIG. 1) is inserted along the line RC denoting the loading center of the device between the small disc guides 18, 19, the center of the disc automatically aligns with the loading center line RC. On the other hand, when a large disc is inserted, the guide position changing device 20 is activated and slides in a manner which permits the disc to enter the slot 16 unhindered.

5. Guide Change Position Device Construction

Figure 9:
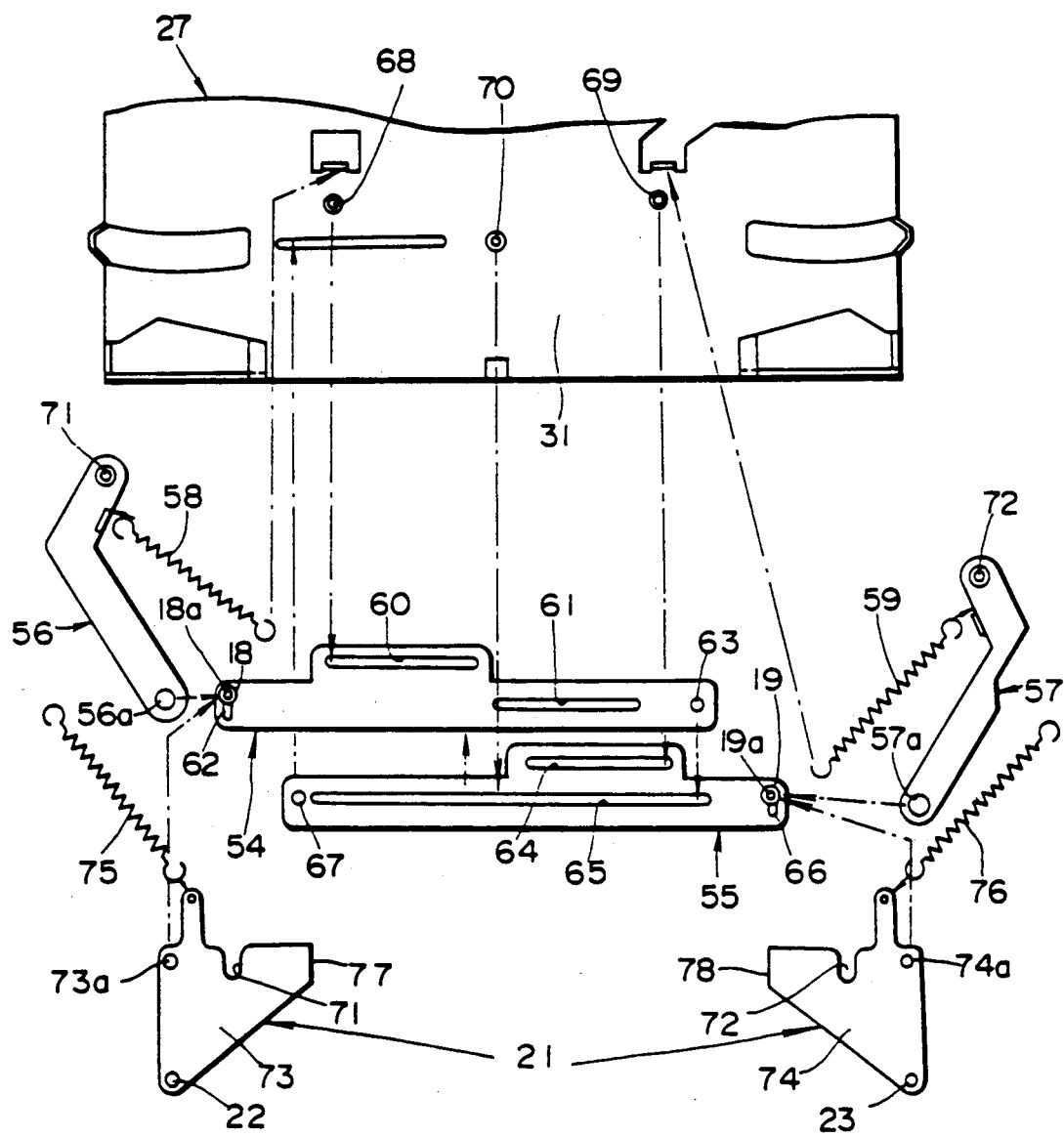
FIG. 9 is an exploded top view of the embodiment depicted in FIG. 1 showing the construction and arrangement of various frames and slide members which form a vital part of the instant embodiment.

FIG. 9 shows in exploded form the construction which characterizes the guide position change device 20. In this arrangement elongate slide plates 54 and 55 are connected with pivotal plates 56 and 57 and arranged so that coil springs 58, 59 apply a bias thereto, respectively. Slide plate 54 (hereinafter referred to as the left slide plate) is formed with two elongate slots 60, 61 which extend essentially parallel to the longitudinal length of the member. A shorter slot 62 is formed at one end and in a manner to extend normally to the slots 60, 61. The small disc guide 18 is slidably received in this slot and arranged to extend down through the same.

The right slide plate 55 (as it will be referred to hereinlater) is formed with elongate slots 64 and 65 in the illustrated manner. A lock pin 63 fixed to the left slide plate 54 is arranged to extend down into slot 65. A relatively short slot 66 is formed in the right hand end of the right slide plate 55, extending normally to the slots 64, 65 and arranged to receive the small disc guide 19 therein. A lock pin 67 is formed at the left hand end of the right slide plate 55 and arranged to extend downwardly through an un-numbered slot formed in the upper frame 27.

A first guide pin 68 is provided on the upper frame 27 proximate the un-numbered slot and arranged to be slidably engaged in first slide guide slot 60 of the left slide plate 54. A second guide pin 69 is also provided on the upper surface of the upper frame 27 and arranged to be slidably enagaged in the third guide slot 64 of the right slide plate. A third guide pin 70 is provided on the upper surface of the upper frame 27 and arranged to be slidably engaged in the guide slots 61 and 65.

Further, in this arrangement, the pivotal frames 56 and 57 are formed with openings 56a and 57a respectively. These openings are arranged to receive the upper shaft portions 18a and 19a of the small disc guides 18 and 19.

The coil springs 58 and 59 which are attached at their one ends to the pivotal plates 56, 57 are attached at their other ends to connection lugs (no numerals) which project up from the upper plate member 31 of the upper frame 27. These springs tend to bias the pivotal plates 56 and 57 to rotate inwardly toward each other as seen in the drawings.

Figure 12:
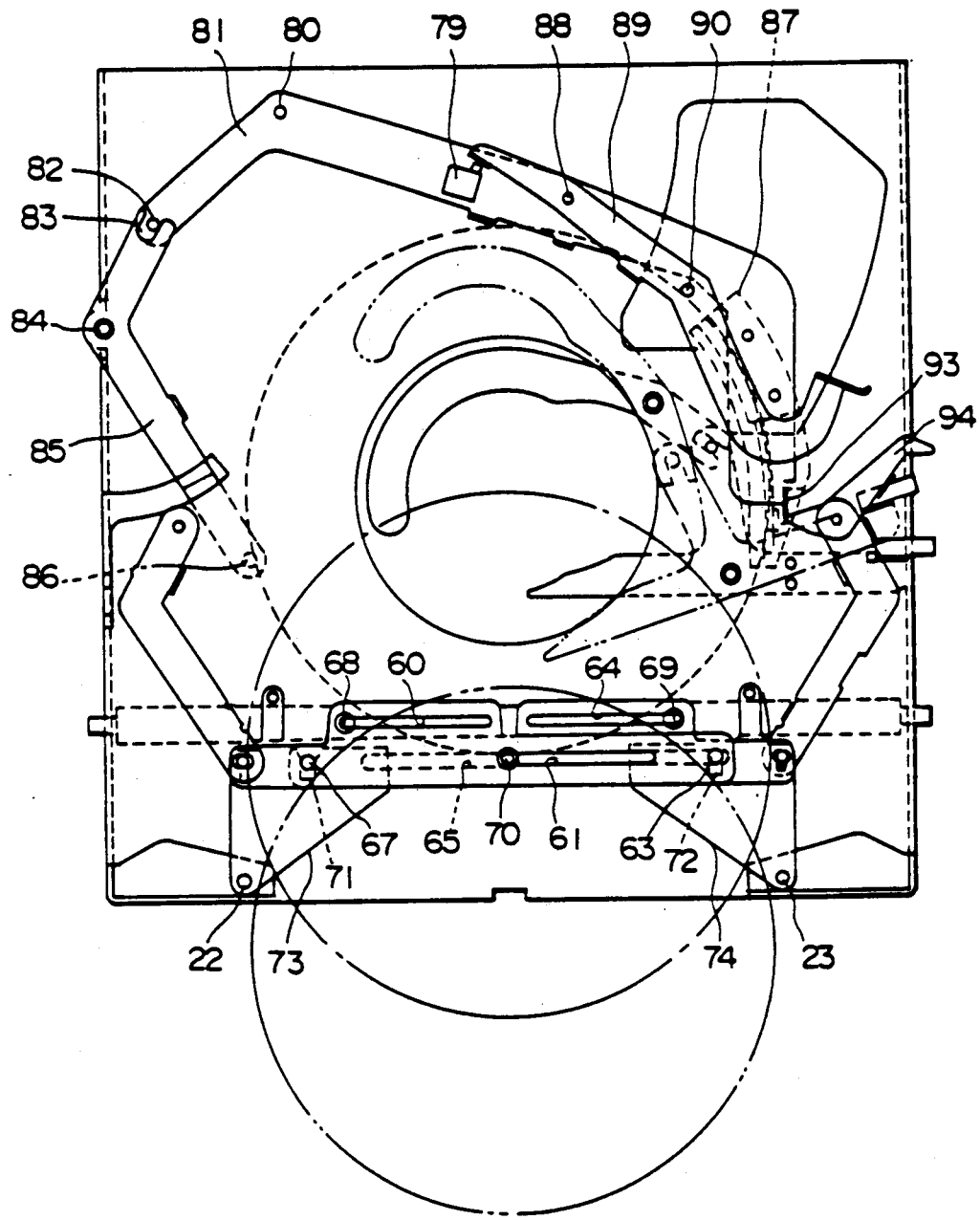
FIG. 12 is a plan view of the embodiment depicted in FIG. 1 showing the loading of a small disc and the configuration assumed by the various levers and associated elements which occurs under such circumstances.

As best seen in FIG. 12, when the first guide pin 68 is positioned in the left end of the first slide slot 60 of the left slide plate 54 and the second guide pin 69 of the right slide plate is positioned in the right end of the third guide slot 64, the slide guide pin 70 assumes a central position in the guide slot 61 and on end position in the guide slot 61. Accordingly, the small disc guides are appropriately located for guiding small discs.

Figure 10:
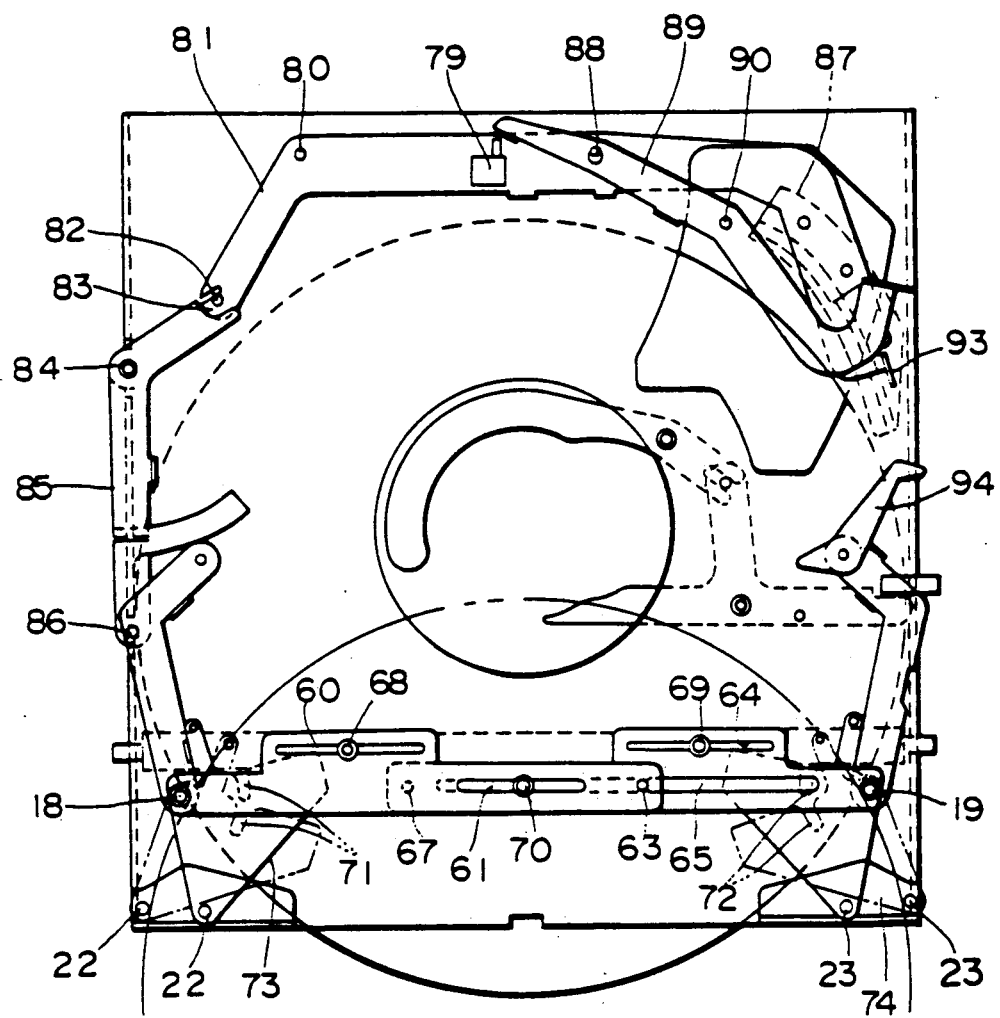
FIG. 10 is a plan view of the embodiment depicted in FIG. 1 showing the loading of a large diameter disc and the configuration assumed by various levers and associated elements in such circumstances.
Figure 11:
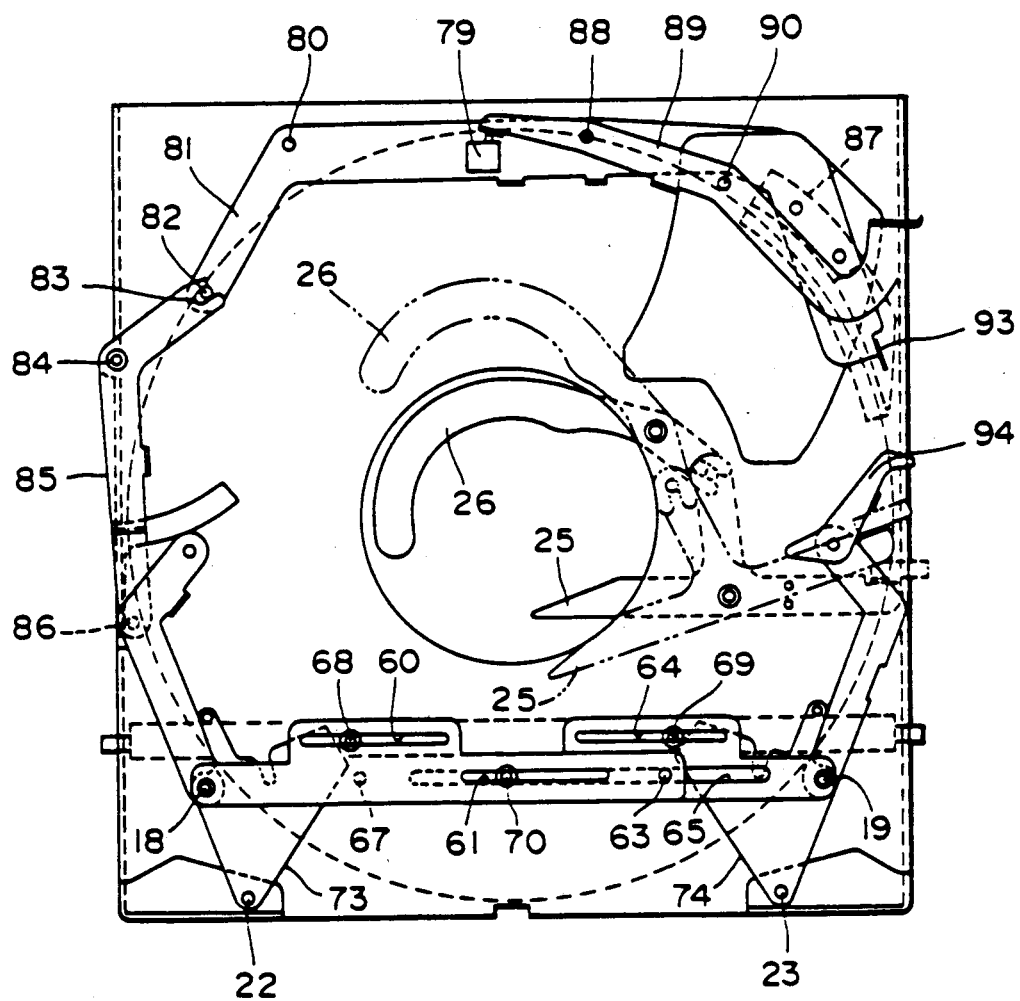
FIG. 11 is a view of the embodiment depicted in FIG. 1 similar to that shown in FIG. 10, but depicts the elements which support a disc clamp separated to permit the clamp to seat on the turntable and secure a disc in place.

According to the present embodiment, the guide position change 20 device is operative in a manner, as shown in FIGS. 10 and 11, to appropriately reposition the small disc guides 18 and 19 upon the insertion of a large disc into the mouth or entrance of the device.

Further, as shown in FIG. 12 due to the re-positioning of the guides 18 and 19 as a result of the operation of the guide position change device 20, centering of the disc is assured.

In this instance the guides are locked in position by the lock devices 21 and the slide guide pins 68 and 69 assume positions in ,essentially the centers of the guide slots 60 and 64, respectively. At the same time the guide pin 70 assumes the illustrated position in the second guide slot 61 formed in the right slide plate 54. Thus the guide slot 65 of the right slide plate 55 assumes an essentially central position and the small disc guides 18, 19 are positioned in the appropriate positions for guiding small discs.

6. Lock Device Construction

Referring more particularly to FIG. 9, the instant embodiment the lock devices take the form of essentially triangular lock plates 73, 74 in which pin engagement recesses 71, 72 are respectively formed. These recesses 71, 72 are arranged to receive the lock pins 63, 67, respectively when the embodiment assumes the condition illustrated in FIG. 12. In this condition the slide plates 54, 55 are prevented from moving either with respect to each other or with respect to the chassis of the device. In this condition, a pair of coil springs 75, 76 function to bias the plates 73, 74 in a manner to rotate in a direction which causes the recesses 71, 72 to be retained in rattle free engagement with the lock pins 71, 72.

The triangular lock plates 73, 74 are formed with openings 73a, 74a which are arranged to receive the shafts 18a and 19a of the guides 18 and 19 (see FIG. 9). Accordingly, when the lock pins 63, 67 are received in the recesses 71, 72 the movement of the guides 18 and 19 is prevented.

The lock plates 73, 74 are further formed with flat end portions 77 and 78. These portions act as stoppers which, when the device assumes the condition illustrated in FIGS. 10 and 11, prevent the inward movement of slide plates 54 and 55 and the guides 18 and 19. This of course again locks the arrangement and prevents inward movement of the guides 18, 19 toward positions suited for small diameter discs.

7. Disc Diameter Detection Arrangement

Sensor probes 22 and 23 are provided on corners of the triangular lock plates 73, 74 and arranged to be located proximate the entrance or mouth of the loading slot 16. These sensor probes 22, 23 further provide a lock releasing function which permits the lock devices 21 to be appropriately released and are located between the entrance 15 and the guides 18 and 19. As will be noted from FIG. 12, when the guides 18 and 19 are locked in position for guiding a small disc, the sensor probes 22 and 23 are spaced by a distance just greater than the diameter of the small disc.

However, when a large disc is inserted through the entrance 15 into the loading slot 16 the periphery of the disc engages the sensor probes 22 and 23 and induces the lock plates 73, 74 to rotate against the bias of springs 75 and 76. This rotation moves the recesses 71, 72 out of engagement with the lock pins 67, 63 thus releasing the slide plates 54 and 55 from their locked state, respectively.

8. Loading End Sensor Construction

FIGS 10 to 12 show details of the arrangement which enables the completion of loading of a disc to be detected.

This construction allows for the difference in diameter of the large and small discs and permits the arrangement to detect the completion of the loading of either type of disc. When the disc is indicated as being located above the turntable 24 (viz., the end of loading) the electromagnetic actuator 52 is energized. A switch 79 which triggers the operation of the actuator 52, is mounted on a bell crank-like lever 81 which is pivoted on the upper plate member of the upper frame 29, on a shaft or pin 80. In this arrangement the short arm of lever 81 is provided with a pin 82 which is received in a recess 83 formed on one end of a second angled lever 85. This lever is arranged to be pivotal about a pin 84 which is also provided on the upper plate member 31.

The second lever 85 is provided with a disc guide member 86 while the first lever 81 is provided with a second disc guide arrangement 87.

In this arrangement the first lever 81 cooperates with a switch activation lever 89 which is pivotal about a shaft 88, projecting upwardly from the first level 81. The activation lever is provided with a disc contact pin 90 which is engageable with the peripheral edges of the large and small discs. Coil springs 91 and 92 are connected to the activation lever 89 and the second angled lever 85 in the manner depicted in FIG. 1. The spring 92 applies a bias which tends to rotate the lever arrangement in a manner which moves the first and second disc guides 86 and 87 inwardly toward the peripheral edge of the loaded disc.

The first angled lever 81 is provided with an upwardly turned flange 93 at one end. This flange 93 is arranged to cooperate with a stopper 94 which selectively locks the first and second angled levers 81, 85 in manner which will be set forth hereinafter.

When a small disc is loaded, the stopper 94 assumes a position such as shown in FIG. 12 wherein it engages the upturned flange 93 and thus holds or locks the disc guides 86 and 87 in the illustrated positions. These positions are such as to locate a small disc in a centered position over the top of the turntable 24. When the disc which is being loaded engages the pin 90 the switch 79 is closed by the resulting movement of the activation lever 89 about the pin 88. The closure of the switch 79 activates the electromagnetic actuator 52.

On the other hand, when a large disc is loaded into the device, the slide plate 55 is moved in a manner which causes the stopper 94 to assume a position which releases the lock on the disc guides 86, 87.

Viz., upon insertion of the large disc the outward movement of sensor probes 22, 23 moves the lock plates 73 and 74 in a manner which in turn moves the pivotal plates 56 and 57 and subsequently moves the angled levers 81 and 85 to the positions illustrated in FIG. 10. In this condition, upon the large disc being fully inserted, the pin 90 is appropriately located to be contacted by the peripheral edge of the same and trigger the operation of the electromagnetic actuator 52.

It should be noted that the clamp release arms 25, 26 are arranged to contact the lower outer edge 96 of the magnetic clamp 95 until such time as the loading of the disc is completed and suspend the same above the disc and the turntable 24. However, following the loading the release arms are permitted to move from the positions shown in solid line in FIG. 11, for example, to those shown in broken line in the same figure. This movement enables the magnetic clamp 95 to be lowered toward the turntable and permitted to attach itself to the center or hub of the same.

OPERATION

The operation of the above described arrangement is such that when a large disc is inserted into the loading entrance of mouth 15; the disc sensor probes 22, 23 are forced outwardly with the result that the lock plates 73, 74 are induced to rotate and release the setting of the lock devices 21 and induce the movement of the slide plates 54 and 55 which define a major portion of the guide position changing device 20.

Following this, the large disc is contacted by the loading roller 17 and moved into the device. The guides 18 and 19 are moved outwardly and induce the slide plates 54 and 55 to also move outwardly. Next, the stopper 94 is moved in a manner wherein the engagement with the upwardly turned flange 93 is lost. The disc comes into contact with the disc guides 86 and 87 which are pushed apart and assume a set position wherein pin 90 is pushed in manner which triggers the switch 79 via movement of the switch actuating lever 89.

The closure of the switch 79 induces the operation of the electromagnetic actuator 52 and causes the idler gear 50 to engage with the rack 51. Due to the drive connection with the loading roller drive motor 45, the idler gear is caused to run down the rack 51 and cause the upper frame 29 to lower. The loaded disc is thus lowered toward the top of the turntable 24 and simultaneously the arms 25, 26, which support the clamp 95, separate and permit the clamp 95 to engage the hub of the turntable 24 and secure the disc in place.

It should be noted that when the large disc is loaded, the small disc guides 18 and 19 are moved so that the separation therebetween is at least equal to the width of the disc. Accordingly, the slide plates 54, 55 are moved in opposite directions causing the lock plates 73, 74 to pivot in a manner which moves the stopper portions 77, 78 into engagement with slide guide pins 68, 69 and out of positions wherein the recesses 71, 72 formed in the lock plates 73, 74 engage the lock pins 63 and 67, respectively.

On the other hand, when the small disc is loaded, the lock plates 73, 74 are not subject to rotation and thus remain in the positions wherein the recesses 71 and 72 engage the lock pins 63 and 67, respectively. Further, the disc diameter sensor probes 22 and 23 are such that they are unmoved by a passage of the small disc, which is centered by the small disc guides 18 and 19, in the positions assumed when the slide plates 54, 55 are locked together.

When he small disc has been fully moved into the device and the pin 90 pressed in a manner which triggers the engagement of the rack 51 and the pinion gear 50, the upper frame 29 is lowered and essentially the same operations as conducted at the end of the loading of the large disc are performed in essentially the same manner.

Figure 13:
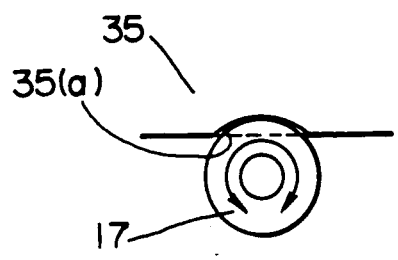
FIGS. 13 and 14 are respectively side and front elevation views showing the construction which permits the clearance between the loading roller and the disc guide plate of the embodiment depicted in FIG. 1 to be varied depending on the diameter of the disc being loaded.
Figure 14:
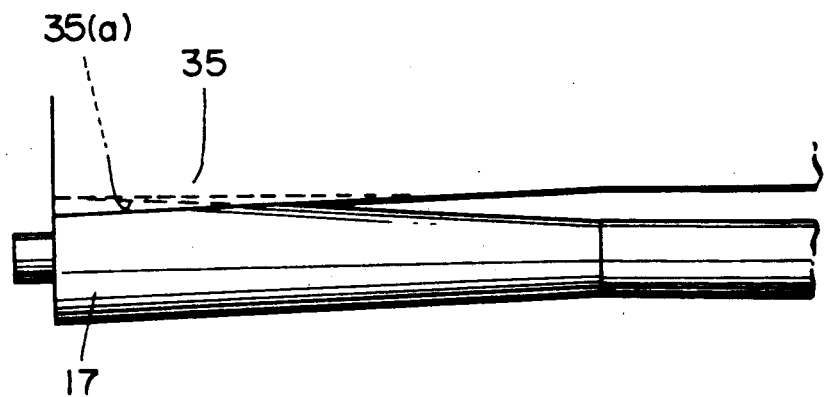
Figure 15:
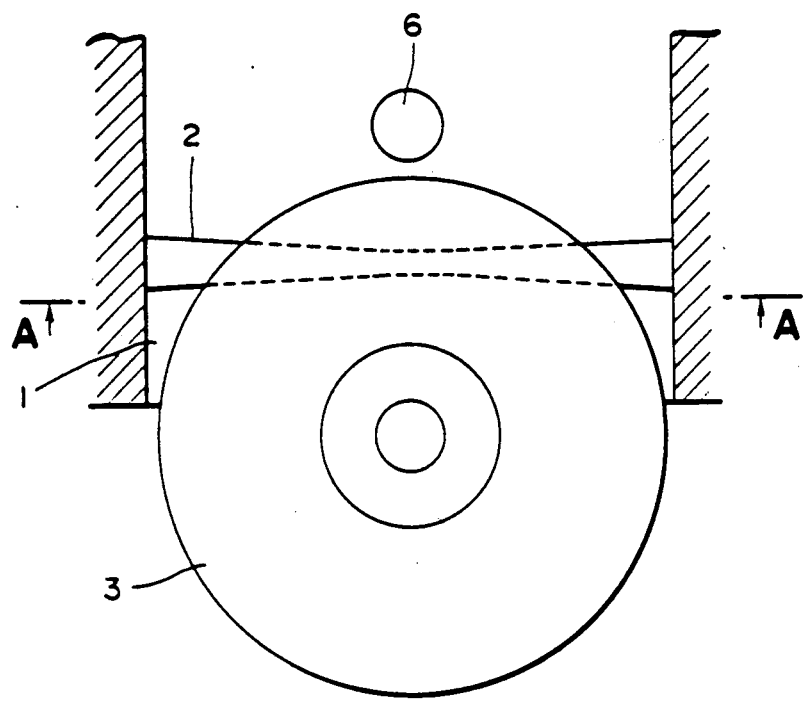
FIGS. 15 to 17 are views showing constructional arrangements found in prior art devices and which have been discussed in the opening paragraphs of the instant disclosure in connection with the problems and shortcomings encountered with said prior art.

FIGS. 13 and 14 show an arrangement which permits the clearance defined between the guide plate 35 and the loading roller 17 to be varied in accordance with the diameter of the disc which is being loaded. In this instance the guide plate 38 is formed with recesses which are shaped and sized in a manner which permit the axial end portions of the tapered loading roller 17 to be received therein. The guide plate 35 is biased toward the guide roller by a suitable spring or elastomeric member (not shown). When a small disc is inserted, the roller 17 and the guide pate 35 assume the position shown in FIG. 14.

Figure 16:
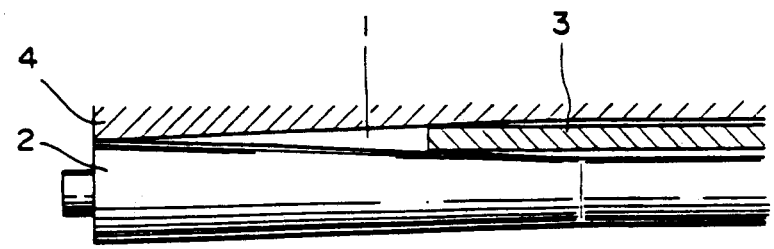
Figure 17:
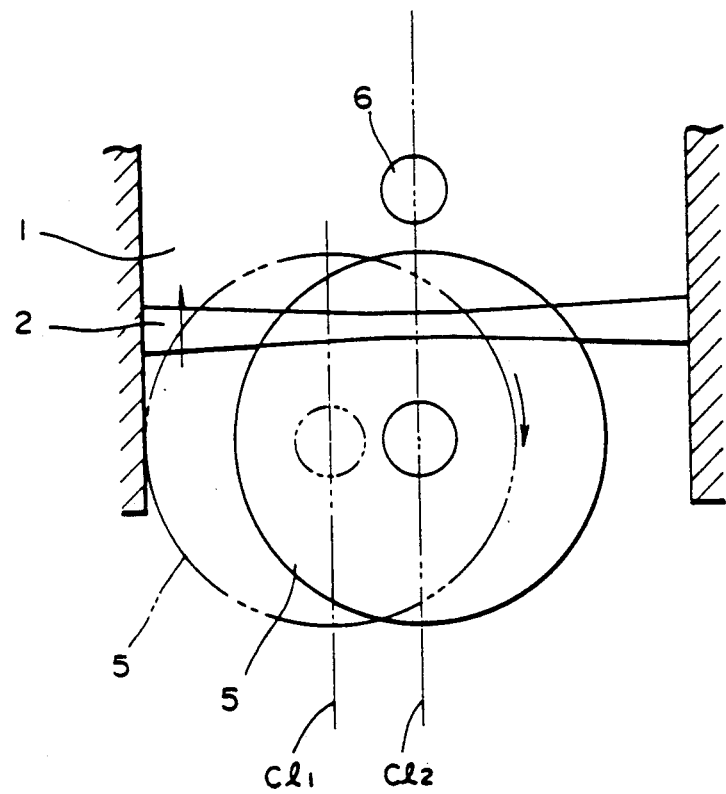

This clearance is selected to ensure that only the appropriate peripheral edge section of the disc is subject to contact by the roller in the manner shown in FIG. 16.

On the other hand, when a large disc is inserted, the guide plate 35 is lifted upwardly against the bias applied thereto to increase the clearance between the roller and the plate to a degree wherein the large disc is gripped in essentially the same manner and with essentially the same force as the small disc.

What is claimed is:

1. In a disc drive for discs of first and second diameters;
  a loading slot through which the disc is introduced into the drive;
  first and second movable disc guides;
  a slide arrangement on which the first and second movable disc guides are mounted;
  a lock arrangement for selectively locking the first and second movable disc guides in first and second predetermined positions, the first position being suited to guiding discs having a first diameter and the second position suited to guiding discs having a second diameter, the second diameter being larger than the first diameter;
  a sensor arrangement responsive to the diameter of the disc being inserted, the sensor arrangement being operatively connected with the lock arrangement for releasing the same from a position suited for discs having a first diameter and permitting the disc guides to be moved to a new second position suited for discs having a second diameter;
  a loading roller, the loading roller being disposed in the loading slot, the roller having a central portion and two tapered axial end portions, the central portion having a diameter which is less than that of the axial ends of the roller, the two tapered axial end portions tapering outwardly from the central portion to the ends of the roller; and
  a guide plate, the guide plate being disposed in the loading slot and having a concave surface which is juxtaposed to the loading roller, the guide plate being arranged with respect to the loading roller in a manner wherein the disc which is being loaded into the drive is contacted on a first surface by the guide plate and contacted on a second, opposite surface by the loading roller, the arrangement of the guide plate and the loading roller being that the disc is contacted only at the peripheral edge portions thereof.

2. A disc drive as claimed in claim 1 further comprising:
  a loading roller, the loading roller being disposed in the loading slot, the roller having a central portion and two tapered axial end portions, the central portion having a diameter which is less than that of the axial ends of the roller, the two tapered axial end portions tapering outwardly from the central portion to the ends of the roller;
  a guide plate, the guide plate being disposed in the loading slot and having a concave surface which is juxtaposed to the loading roller, the guide plate being arranged with respect to the loading roller in a manner wherein the disc which is being loaded into the drive is contacted on a first surface by the guide plate and contacted on a second, opposite surface by the loading roller, the arrangement of the guide plate and the loading roller being that the disc is contacted only at the peripheral edge portions thereof.

3. A disc drive as claimed in claim 1 wherein the guide plate is resiliently mounted in the loading slot in a manner to be biased toward the loading roller, the guide plate being formed with recesses into which the tapered axial end portions of the loading roller can be received, the recesses being so shaped and sized with respect to the size and shape of the loading roller that when the axial end portions of the loading roller are received in the recesses the guide plate and the loading roller are spaced by a distance suitable for loading discs having the first diameter.

4. A disc drive as claimed in claim 1 wherein the slide arrangement comprises:
  an upper frame member;
  first and second essentially flat slide plates, the first and second slide plates being arranged one on the other and each formed with first and second guide slots;
  first and second slide guide pins, the first and second slide guide pins being fixed to the surface of the upper frame member, the first and second slide guide pins being received in the first guide slots of the first and second slide plates;
  a third slide guide pin fixed to the upper frame member, the third slide guide pin being received in the second guide slots of the first and second slide plates.

5. A disc drive as claimed in claim 4 wherein the first guide slots of the first and second slide plates are arranged so that when the first and second slide guide pins are proximate the inboard ends of the first guide slots, the first and second slide plates have been moved in a manner to achieve the maximum separation of the first and second movable disc guides, and so that when the first and second slide guide pins engage the outboard ends of the first guide slots, the first and second slide guide plates have been moved in a manner to achieve the minimum separation of the movable disc guides, the minimum separation being essentially equal to the first diameter, the maximum separation being essentially equal to the second diameter.

6. A disc drive as claimed in claim 5, wherein the lock arrangement comprises:

a first lock pin mounted on the inboard end of the first slide plate and a second lock pin mounted on the inboard end of the second slide plate;

first and second lock plates, the first and second lock plates being pivotally mounted on the outboard ends of the first and second slide plates respectively, the first and second lock plates being formed with recesses which respectively engage the first and second lock pins when the first and second slide plates assume positions wherein the first and second movable disc guides are separated by the minimum separation and the first and second lock plates are rotated to first locking positions, the first and second lock plates being formed with stopper portions which engage the first and second slide guide pins when the first and second slide plates assume positions wherein the first and second movable disc guides are separated by the maximum separation and wherein the first and second lock plates are rotated to second lock positions.

7. A disc drive as claimed in claim 6 wherein the sensor arrangement comprises first and second probes, the first and second probes being mounted on the first and second lock plates, the first and second probes assuming positions wherein no contact occurs between the probes and the peripheral edges of a disc having the first diameter, the first and second probes being moved away from each other when a disc having a second diameter is inserted into the loading slot, the movement of the first and second probes under such conditions causing the first and second lock plates to rotate away from their respective first locking positions and toward their respective second locking positions.

8. A disc drive as claimed in claim 7 further comprising:

a turntable on which a disc is to be loaded;

lever means, the lever means including:

a switch and actuating lever arrangement, which is responsive to the entry of a disc into the drive, for producing a signal indicative of the loading of the disc into the drive;

a first angled lever pivotally mounted on the upper frame member, the first angled lever supporting the switch and actuating lever arrangement;

contact means mounted on the first angled lever, the contact means being arranged to be engageable with the peripheral edge of the disc which is loaded into the drive;

a second angled lever, the second angled lever being operatively connected at one end to one end of the first angled lever, the second angled lever including an edge sensing pin engageable with the peripheral edge of the disc which is loaded into the drive;

means for biasing the first and second angled levers in a manner which causes the contact means and the edge sensing pin to move inwardly and essentially toward the turntable.

9. A disc drive as claimed in claim 8 wherein the first angled lever includes a flange member, and which further comprises and second pivotal plate members, the first pivotal plate member being pivotally mounted on the first slide plate and means for biasing the first pivotal plate member in a direction to rotate inwardly, the first pivotal plate member having a lock member which is engageable with the flange member in manner to lock the lever means in a predetermined arrangement, the first pivotal plate member being moved in response to the insertion of a disc having a second diameter into the loading slot, in a manner to release the engagement between the lock member and the flange member.

* * * * *